United States Patent [19]

Nishio

[11] Patent Number: 5,112,577
[45] Date of Patent: May 12, 1992

[54] APPARATUS FOR REMOVING DISPERSION MEDIUM IN METAL OR CERAMIC MOLDED BODY

[75] Inventor: Hiroaki Nishio, Tokyo, Japan

[73] Assignee: NKK Corporation, Tokyo, Japan

[21] Appl. No.: 578,998

[22] Filed: Sep. 7, 1990

[30] Foreign Application Priority Data

Sep. 7, 1989 [JP] Japan .................. 1-230356

[51] Int. Cl.⁵ .................. B01J 8/00; B01D 11/04
[52] U.S. Cl. .................. 422/187; 422/199;
422/234; 422/258; 425/86; 134/108; 134/109; 164/412
[58] Field of Search .......... 422/187, 198, 199, 225,
422/234, 235, 255, 258; 164/404, 412; 425/86 X; 210/181; 134/105, 108, 109; 264/344

[56] References Cited

U.S. PATENT DOCUMENTS

| 2,418,148 | 4/1947 | Williams et al. | 422/198 |
| 4,101,340 | 7/1978 | Rand | 134/109 |
| 4,204,913 | 5/1980 | Sabatka | 134/109 |
| 4,537,660 | 8/1985 | McCord | 134/109 |
| 4,929,312 | 5/1990 | Westcott | 134/109 |
| 5,021,213 | 6/1991 | Nishio et al. | 419/36 |

FOREIGN PATENT DOCUMENTS

| 3545894 | 7/1986 | European Pat. Off. | 264/63 |
| 0311407 | 4/1989 | European Pat. Off. | 419/2 |
| 0362866 | 4/1990 | European Pat. Off. | |
| 0372761 | 6/1990 | European Pat. Off. | 208/314 |
| 0384864 | 8/1990 | European Pat. Off. | |
| 0412458 | 2/1991 | European Pat. Off. | |
| 2715563 | 11/1977 | Fed. Rep. of Germany | 75/228 |
| 3006098 | 9/1980 | Fed. Rep. of Germany | 264/63 |

Primary Examiner—Robert J. Warden
Assistant Examiner—Theresa A. Trembley
Attorney, Agent, or Firm—Sughrue, Mion, Zinn, Macpeak & Seas

[57] ABSTRACT

An apparatus for removing the dispersion medium in a metal or ceramic molded body which comprises a dispersion medium-removing vessel includes a condensing zone located in a upper part and a boiling zone located in a lower part, a separator to separater a solvent in the dispersion medium solution discharged from the vessel by heating the solution at a temperature higher than the boiling point of the solvent to evaporate it, the boiling zone being connected with the separator through a pipe to transport the dispersion medium solution and a pipe to transport the vaporized solvent to form a circuit, and a pump provided in the circuit. In the apparatus since the dispersion medium is removed in the boiling solvent, keeping a constant temperature is easy. The dispersion medium is promptly removed by contacting it with a solution of which the concentration of the dispersion medium is always low due to continuous removal of the dispersion medium in the separator. Since the boiling point of the solvent is about 20° to 150° C., the molded body is gently heated. Therefore, the occurrence of defects such as cracks is rare in the molded body.

2 Claims, 1 Drawing Sheet

APPARATUS FOR REMOVING DISPERSION MEDIUM IN METAL OR CERAMIC MOLDED BODY

BACKGROUND OF THE INVENTION

1. Field of the Invention

This invention relates to an apparatus for removing the dispersion medium in a metal or ceramic molded body formed through a plastic molding.

2. Description of the Prior Art

There is a method of manufacturing a molded body which comprises kneading a metal or ceramic powder with a dispersion medium such as plastic resin or wax under heating to obtain a compound having plasticity, and molding the compound by extrusion molding, injection molding, press molding or the like. The molded body is heated up to 400° to 600° C. to remove the dispersion medium by converting into gases through thermal decomposition. Thereafter, the molded body is heated in vacuo or in an atmosphere of hydrogen gas, nitrogen gas, argon gas or the like to course densification, and a sintered body is obtained.

A known apparatus used for the dewaxing method is a dewaxing furnace composed of a box shape or cylindrical shape vessel including a heater (Katsuyoshi Saito, "Fain Seramikkusu no Seikei to Yukizairyo (Molding of Fine Ceramics and Organic Materials)", page 326, published by C.M.C, 1985).

In the above conventional dewaxing method of removing the dispersion medium, a great quantity of gases is generated by the thermal decomposition of the dispersion medium, and the gases are necessarily removed from the inside of the molded body. Therefore, the temperature must be elevated slowly, and it requires about 150 hours. When the rate of temperature rise is erroneously set, defects such as cracking and expansion are generated in the molded body. The above apparatus is used for the conventional method to remove the dispersion medium by thermal decomposition, and therefore, the treatment using this apparatus has the problems of the conventional method.

SUMMARY OF THE INVENTION

An object of the invention is to provide an apparatus capable of removing the dispersion medium in a metal or ceramic molded body without the generation of defects such as cracking and expansion in the molded body.

Another object of the invention is to provide an apparatus capable of removing the dispersion medium in a metal or ceramic molded body while shortening the removing time sharply.

The present invention provides an apparatus for removing the dispersion medium in a metal and/or ceramic molded body which has achieved the above objects, comprising a dispersion medium-removing vessel comprising a condensing zone located in the upper part and a boiling zone located in the lower part, a separator to separate the solvent in the dispersion medium solution discharged from the vessel by heating the solution at a temperature higher than the boiling point of the solvent to evaporate it, said boiling zone connected with said separator through a pipe to transport the dispersion medium solution and a pipe to transport the vaporized solvent to form a circuit, and a pump provided in the circuit.

DETAILED DESCRIPTION OF THE INVENTION

Figure 1:
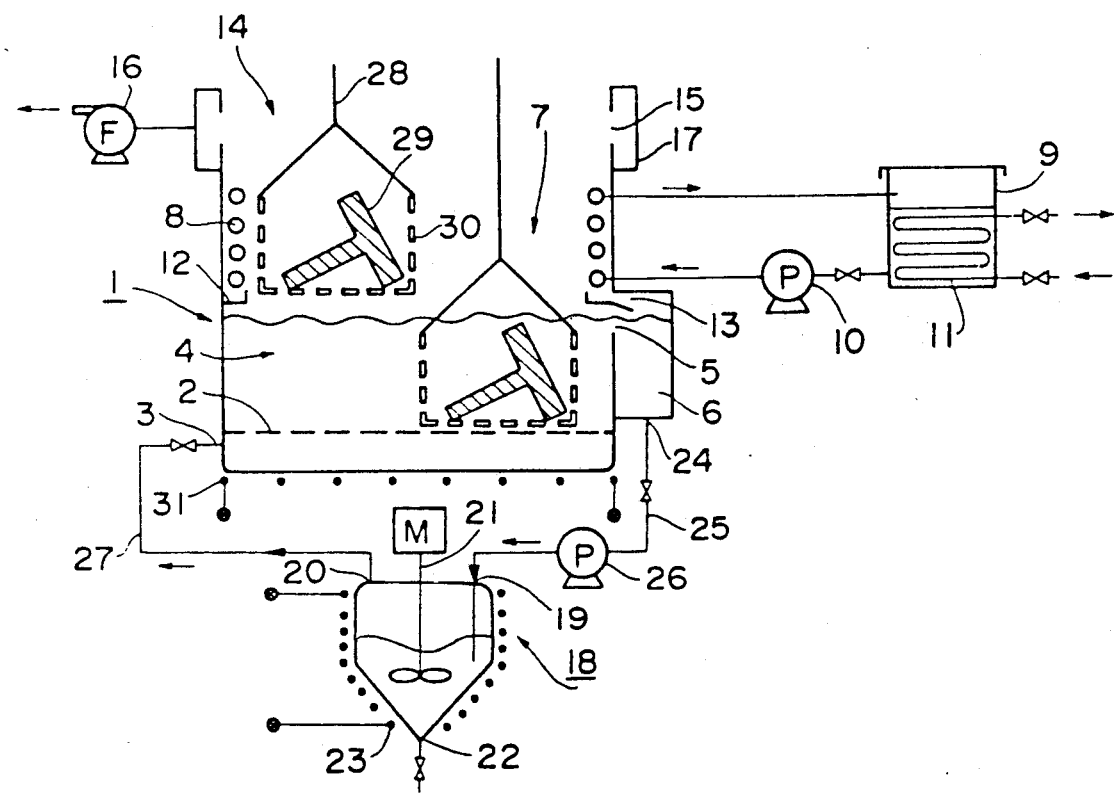
FIG. 1 is a block diagram illustrating an embodiment of the apparatus of the invention.

The condensing zone of the dispersion medium-removing vessel is opened at both of the upper end and the lower end and has a heat exchange surface such as coil or plate cooled by a cooling medium. Alternatively, the peripheral wall of the upper part of the vessel may be the heat exchange surface.

The boiling zone receives the solvent to extract the dispersion medium, and the upper part is connected with the condensing zone. The boiling zone has an inlet port for the vaporized solvent and an outlet port for the dispersion medium solution produced by extracting the dispersion medium with the solvent. Moreover, the boiling zone has a structure capable of taking in and out the molded body. The diameter of the boiling zone may be identical with or different from the condensing zone. For example, the boiling zone is made in a rectangular box shape, and the condensing zone is joined to both sides of the upper side of the rectangular box. The remaining upper side of the rectangular box between the joined parts to the condensing zone is closed. A conveyor for the molded body may be provided in the boiling zone. The inlet port for the solvent is preferably disposed at the bottom portion or the neighborhood thereof, and the outlet port for the dispersion medium solution is preferably disposed distant from the inlet port. It is convenient that the molded body is taken in and out through the condensing zone, however the taking in and out portion of the molded body may be provided separately.

The boiling zone may be provided with a support for the molded body. The support is constructed of a lattice, wire-netting or the like so that the solvent circulates therethrough. A heating source may be provided in addition to the vaporized solvent. Suitable heating sources include heating means utilizing electric power, a heating medium having a temperature higher than the boiling point of the solvent, etc.

The separator is a closed vessel including a heating source or with a wall being a heat exchange surface, and has an inlet port for the solution and an outlet port for the vaporized solvent. The separator may be provided with a stirrer for accelerating the separation of the dispersion medium from the solvent. The location of the separator is not limited, and either of the separator or the dispersion medium-removing vessel may be upper with respect to the other. Both apparatus may also be at the same height.

The dispersion medium-removing vessel is connected with the separator through a pipe to transport the dispersion medium solution and a pipe for the transportation of the vaporized solvent to form a circuit of the solvent. A pump is provided in the circuit. The pump may be any one capable of circulating the solvent between the dispersion medium-removing vessel and the separator, and it may be a mere propeller as well as various liquid delivery pumps. The pump is preferably provided on the side of the pipe to transport the dispersion medium solution. The circuit may be provided with other devices such as a flow controlling mechanism, a solvent supply line and a check value.

In the operation of the above apparatus, the solvent is placed in the boiling zone, and supplied to the separator through the pipe to transport the dispersion medium solution by working the pump. Subsequently, the condensing zone is cooled to a temperature lower than the boiling point of the solvent, and then, the solvent in the separator is evaporated by heating. The vaporized solvent is delivered to the boiling zone through the pipe which transports the vaporized solvent. Thus, the solvent is circulated between the boiling zone and the separator to raise the temperature, and the boiling zone is rendered in a boiling state. The metal or ceramic molded body is immersed in the boiling zone to extract the dispersion medium in the molded body. The solvent containing the extracted dispersion medium, i.e. the dispersion medium solution, is transported to the separator, and the solvent alone is evaporated by heating to return to the boiling zone. The dispersion medium remains in the separator.

A suitable dispersion medium of the metal or ceramic powder is paraffin wax expected to exercise a forming force by coagulation, and as the dispersion medium having a great effect to impart fluidity, there are alcohols such as methanol, ethanol, propanol and butanol, ketones such as acetone, low molecular weight hydrocarbons such as hexane and benzene, liquid paraffin, fatty acids such as stearic acid, etc. The dispersion medium may be composed of a single component or two or more components. The apparatus of the invention is applicable for removing the dispersion medium in the molded body of which the formability is imparted by casting a metal or ceramic slurry into the porous mold disclosed in Japanese Patent Application No. 1-158338.

The solvent used in the method of the invention must have an ability to dissolve the dispersion medium. When the dispersion medium is composed of plural components, the solvent necessarily dissolves 40 to 100 wt. % of the total amount of the dispersion medium. When the extracted amount of the dispersion medium is less than 40 wt. %, it is difficult to avoid the generation of cracking in the molded body during the thermal decomposition after the extraction of the dispersion medium with the solvent. A suitable solvent has a boiling point of 20° to 150° C., preferably 20° to 60° C. When the boiling point is lower than 20° C., the boiling state is influenced by room temperature, and to control the boiling state is difficult, while when the boiling point is beyond 150° C., pores and cracks occur in the molded body during the extraction of the dispersion medium. The boiling point may be adjusted, if necessary to the above range by controlling the pressure. Suitable solvents are trichlorotrifluoroethane, various solvent mixtures thereof with ethanol, methylene chloride, isopropanol, acetone or the like, tetrachlorodifluoroethane, various solvent mixtures thereof with trichlorotrifluoroethane, isooctane, n-propanol or the like, trichloromonofluoromethane, trichloroethane, trichloroethylene, perchloroethylene, methylene chloride, benzene, toluene, xylene, methanol, ethanol, isopropanol, etc. Preferable solvents have a high ability to dissolve the dispersion medium and are selected according to the kind of the dispersion medium or the like. For example, when the dispersion medium is paraffin wax, preferable solvents include trichlorotrifluoroethane, a solvent mixture of trichlorotrifluoroethane and ethanol, a solvent mixture of trichlorotrifluoroethane and methylene chloride, and methylene chloride. When a low molecular weight alcohol, ketone or hydrocarbon is selected as the dispersion medium, most of the aforementioned solvents are applicable. However, trichloromonofluoromethane and methylene chloride having a low boiling point are preferred. When liquid paraffin is selected, preferable solvents are trichloromonofluoromethane, a solvent mixture of trichlorotrifluoroethane and methylene chloride. In the case of stearic acid, trichlorotrifluoroethane is applicable. According to each dispersion medium, a suitable solvent may be selected from the solvents to which the solubility of the dispersion medium is known to be high, while a suitable solvent may be selected for each dispersion medium by conducting an experiment.

The extracting time is determined so that the dispersion medium is extracted up to a prescribed degree, and it is usually 3 to 60 hours, though it varies according to the kind of the solvent, the kind of the dispersion medium and the like. The temperature of the molded body is preferably warmed close to the boiling point of the solvent prior to immersing. When the molded body is directly immersed in the boiling solvent, surface separation occasionally occurs caused by the rapid temperature change. The preliminary warming may be conducted utilizing the vapor of the boiling water.

The king of metal of the molded body applicable to the method of the invention includes iron, Fe-Ni alloy, stainless steel, high speed steel, Ni base alloy, Co base alloy, and the like. The ceramic includes oxides such as alumina and zirconia, nitrides such as silicon nitride and aluminum nitride, carbides such as silicon carbide and boron carbide, borides such as titanium diboride and zirconium diboride, and the like. The molded body may be a cermet which is a metal-ceramic complex body, such as $Al_2O_3$—Ni alloy or WC—Co. The particle size of the metal and ceramic powder is usually about 0.2 to 100 μm. The metal or ceramic molded body optionally contains a sintering aid, various additives and the like.

In the apparatus of the invention, the dispersion medium in the molded body is extracted with the boiling solvent in the boiling zone. Since the extraction is conducted in the boiling solvent, the bath is kept at a constant temperature by the agitation effect due to boiling. The extract solvent is promptly removed from the surface of the molded body to prevent the decrease of the extracting rate of the dispersion medium caused by covering the surface with the dispersion medium in a high concentration. The vaporized solvent rises from the boiling zone to the upper part, and comes in the condensing zone. Then, the solvent vapor condenses by touching the cooled heat exchange surface. Thus, escape of the vaporized solvent is prevented. The solvent containing the extracted solvent is transported to the separator, and vaporized by heating. The solvent purified by vaporization is returned to the boiling zone. The solvent vapor is also utilized as a heating source of the boiling zone. The dispersion medium remains to be accumulated in the separator.

As mentioned heretofore, in the apparatus of the invention, since the dispersion medium is removed in the boiling solvent, to keep a constant temperature is easy. The dispersion medium is continuously removed in the separator and thus the concentration of the dispersion medium, in the solution in the boiling zone is always low due to continuous removal of the dispersion medium in the separator. The vaporized solvent is recovered in the condensing zone, and recycled. Since the boiling point of the solvent is about 20° to 150° C., the molded body is gently heated compared with the conventional thermal decomposition method heated up to 400° to 600° C. Therefore, the occurrence of defects such as cracks is rare in the molded body.

EXAMPLE

An example of the apparatus of the invention is shown in FIG. 1. The lower part of the dispersion medium-removing vessel 1 is partitioned with a wire-netting 2, and an inlet port 3 of the vaporized solvent is provided on the peripheral wall lower than the wire-netting 2. An outlet port 5 for the dispersion medium solution is provided on the peripheral wall of the upper part of the boiling zone 4 above the wire-netting 2, and the dispersion medium solution overflows therefrom to a solution tank 6. The upper part of the dispersion medium-removing vessel 1 is the condensing zone, and a cooling coil 8 wherein a cooling medium flows is disposed near the peripheral wall. The cooling medium is supplied from a cooler 9 by a cooling medium pump 10, and after passing through the cooling coil 8, it returns to the cooler 9. The coil 11 passes a cooling medium circulated between a refrigerator (not illustrated). The solvent condenses on the surface of the cooling coil 8, and drops. The conduit 12 positioned under the cooling coil 8 collects the liquid drops, and the collected solvent is put in the solution tank 6 through the exhaust port 13. A shielding zone 14 is provided at the upper part of the condensing zone, i.e., the topmost part of the dispersion medium-removing vessel, and uncondensed solvent vapor is sucked together with air by an exhaust fan 16, and exhausted through the duct 17. An electric heater 31 is provided at the bottom of the dispersion medium-removing vessel 1, and is used for the acceleration of boiling or the shortening of the starting time.

The separator 18 is a vessel having an inlet port 19 of the solution and an outlet port 20 of the vaporized solvent, and provided with a stirrer 21 at the upper part. An exhaust port 22 for the dispersion medium is provided at the bottom. A separator heater 23 is attached to the outside of the vessel.

The inlet port 19 for the solution is connected with the outlet port 24 for the dispersion medium solution of the solution tank 6 through the pipe 25 to transport the dispersion medium solution, and the pump 26 is interposed therein for delivering the solution to the separator 18. The outlet port 20 for the vaporized solvent is connected with the inlet port 3 of the vaporized solvent through the pipe 27 to transport the vaporized solvent.

As the procedure to use this apparatus, a prescribed quantity of the solvent is placed in the boiling zone 4, and a part of the solvent is transferred to the separator 18 by the pump 26. The cooling coil 8 is cooled to a prescribed temperature, and the exhaust fan 16 is operated. The bottom electric heater 31 and the separator heater 23 are switched on to start heating. When the solvent reaches the boiling state, the bottom electric heater 31 is switched off. Thus, the preliminary arrangement is finished. Subsequently, a punched stainless steel container 30 wherein the molded body 29 is placed is hung by a hanger 28, and put in the condensing zone 7. The molded body 29 is preheated therein until condensed liquid drops are not observed on the surface of the molded body 29 and the stainless steel container 30, and then immersed in the boiling solvent in the boiling zone 4. The solvent becames a solution by dissolving the dispersion medium in the molded body, and a part of the solution overflows from the outlet port 5 for the solution and enters the solution tank 6. The solvent condensed in the condensing zone also flows into the solution tank 6 to dilute the solution. The solution passes through the pipe 25 to transport the dispersion medium solution to in the separator 18. The solution is heated in therein to evaporate the solvent, and the vaporized solvent passes the through pipe 27 to transport the vaporized solvent to the boiling zone 4 through the inlet port 3 for the vaporized solvent The vaporized solvent is heated to boil the solvent in the boiling zone 4, and agitate it. The extracted dispersion medium is accumulated in the separator.

I claim:

1. An apparatus for removing a dispersion medium for metal or ceramic in a metal or ceramic molded body which comprises a dispersion medium-removing vessel comprising a condensing zone containing cooling means, which condensing zone is located in an upper part of the vessel and a boiling zone containing heating means located in a lower part of the vessel, said vessel also comprising means to introduce a metal or ceramic molded body into the boiling zone, a separator to separate a solvent in the dispersion medium solution which is in solution as discharged from the vessel by heating the solution at a temperature higher than the boiling point of the solvent to evaporate the solvent, said boiling zone being connected to said separator through a pipe to transport the dispersion medium solution and a pipe which transports the vaporized solvent from one to the other, thereby forming a circuit, and a pump provided in the circuit.

2. The apparatus of claim 1, further provided with means to accumulate said dispersion medium in the separator.

* * * * *